(12) United States Patent
Isurugi et al.

(10) Patent No.: US 8,747,683 B2
(45) Date of Patent: Jun. 10, 2014

(54) DIE FOR MOTH-EYE, AND METHOD FOR PRODUCING DIE FOR MOTH-EYE AND MOTH-EYE STRUCTURE

(75) Inventors: Akinobu Isurugi, Osaka (JP); Kiyoshi Minoura, Osaka (JP); Tokio Taguchi, Osaka (JP); Takao Imaoku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/511,315

(22) PCT Filed: Nov. 25, 2010

(86) PCT No.: PCT/JP2010/071030
§ 371 (c)(1),
(2), (4) Date: May 22, 2012

(87) PCT Pub. No.: WO2011/065429
PCT Pub. Date: Jun. 3, 2011

(65) Prior Publication Data
US 2012/0234794 A1   Sep. 20, 2012

(30) Foreign Application Priority Data

Nov. 27, 2009  (JP) .................................. 2009-270783

(51) Int. Cl.
*B31D 3/00* (2006.01)
(52) U.S. Cl.
USPC ................... 216/56; 216/11; 216/83; 216/96; 216/102; 249/60; 428/141; 428/156; 428/220; 428/689; 428/745; 977/811
(58) Field of Classification Search
None
See application file for complete search history.

(56) References Cited

U.S. PATENT DOCUMENTS

| | | |
|---|---|---|
| 7,066,234 B2 | 6/2006 | Sawitowski |
| 7,835,080 B2 | 11/2010 | Taguchi et al. |
| 2007/0159698 A1* | 7/2007 | Taguchi et al. ............... 359/586 |
| 2009/0107848 A1 | 4/2009 | Esteban et al. |

FOREIGN PATENT DOCUMENTS

| | | |
|---|---|---|
| CN | 101423965 | 5/2009 |
| JP | 2003-294910 A | 10/2003 |
| JP | 2003531962 A | 10/2003 |
| JP | 2005-173457 A | 6/2005 |
| JP | 2005156695 A | 6/2005 |

(Continued)

OTHER PUBLICATIONS

Hayashibe, K. et al., "22.4L: *Late News-Paper*.: Under 0.05% Reflectance Optical Devices using Improved Motheye Anti-relection Structure", SID 09 Digest, pp. 303-305.

(Continued)

*Primary Examiner* — Lan Vinh
*Assistant Examiner* — Jiong-Ping Lu
(74) *Attorney, Agent, or Firm* — Harness, Dickey & Pierce, P.L.C.

(57) ABSTRACT

A mold of an embodiment of the present invention has a surface that has a shape which is inverse of a surface shape of a moth-eye structure. This surface has a plurality of protrusions, a plurality of ridges extending between the plurality of protrusions via saddle portions, and a plurality of holes, each of which is defined by at least any three of the plurality of protrusions and ridges extending between the at least any three of the plurality of protrusions, and an average distance between centers of adjacent holes, p, and an average depth of the saddle portions, r, satisfy the relationship of $0.15 \leq r/p \leq 0.60$.

7 Claims, 13 Drawing Sheets

(56) References Cited

FOREIGN PATENT DOCUMENTS

| | | | |
|---|---|---|---|
| JP | 2009-139796 A | 6/2009 | |
| JP | 2009-166502 A | 7/2009 | |
| JP | 2009-199086 A | 9/2009 | |
| WO | WO-2006059686 A1 | 6/2006 | |

OTHER PUBLICATIONS

International Search Report.
International Preliminary Report on Patentability dated Jul. 19, 2012.

* cited by examiner (a)

(b)

(a)

(b)

(a)

(b)

(c)

(d)

(a)  300A (b)  400A (c)  300B (d)  400B (e)  100

(f)  200

(a)

(b)

DIE FOR MOTH-EYE, AND METHOD FOR PRODUCING DIE FOR MOTH-EYE AND MOTH-EYE STRUCTURE

TECHNICAL FIELD

The present invention relates to a mold for a moth-eye structure, a method for manufacturing a mold for a moth-eye structure, and a method for forming a moth-eye structure.

BACKGROUND ART

When light is reflected at an interface between materials of different refractive indices (for example, the interface between air and glass), the amount of transmitted light decreases so that the visibility may deteriorate. To prevent such reflection of light, using an antireflection film which has a moth-eye structure has been considered (see Non-patent Document 1 and Patent Documents 1 to 4).

The moth-eye structure is a minute structure whose size is generally equal to or smaller than the wavelengths of visible light ($\lambda$=380 nm to 780 nm). The effective refractive index of the moth-eye structure for light that is incident on a substrate continuously changes along the depth direction, from the refractive index of a medium on which the light is incident to the refractive index of the material that forms the moth-eye structure, whereby reflection of light is prevented. For example, in a moth-eye structure which prevents reflection of visible light, the two-dimensional size of the raised portions is not less than 10 nm and less than 500 nm. The incidence angle dependence of the antireflection effect which is achieved by such a moth-eye structure is small over a wide wavelength range. The moth-eye structure can be realized by a wide variety of materials. Also, the moth-eye structure can be directly formed on a substrate and therefore can be formed at a low cost.

The moth-eye structure can be formed by laser interference exposure or EB exposure. However, by utilizing anodization of aluminum, a large surface moth-eye structure can readily be formed at a low cost. Specifically, a porous alumina layer which is obtained by anodizing aluminum is used as at least part of a mold for the moth-eye structure, whereby the manufacturing cost can be greatly reduced. Thus, forming the moth-eye structure by means of anodization has been receiving attention (Patent Documents 2 to 4).

In this specification, the "mold" includes molds that are for use in various processing methods (stamping and casting), and is also referred to as a stamper. The mold can also be used for printing (including nanoimprinting). In the following descriptions of this specification, a mold which is used for formation of a moth-eye structure is also referred to as "moth-eye mold".

Patent Document 2 discloses a mold which has a porous alumina layer formed by anodization over its surface. In general, recesses formed by anodization in the porous alumina layer, which are on the order of nanometers and which have cylindrical shape, are elongated in a vertical direction relative to the surface of the porous alumina layer, and are also referred to as micropores.

A porous alumina layer formed under specific conditions includes cells in the shape of a generally regular hexagon which are in a closest packed two-dimensional arrangement when seen in a direction normal to the surface. Each of the cells has a micropore at its center. The arrangement of the micropores is periodic. In a porous alumina layer formed under different conditions, micropores may constitute an arrangement with a regularity degraded to some extent or an irregular (i.e., non-periodic) arrangement.

Patent Document 3 discloses a mold which has tapered micropores with continuously changing pore diameters along the depth direction, the micropores having been formed by repeating anodization of aluminum and a pore diameter increasing process by means of etching. Patent Document 4 discloses a stamper (mold) which is manufactured by repeating anodization of aluminum and a pore diameter increasing process till adjacent holes are partially connected together.

FIG. 18(*a*) is a schematic perspective view of a stamper 700 disclosed in Patent Document 4. FIG. 18(*b*) is a schematic plan view of the stamper 700. At the surface of the stamper 700, there are six protrusions around each of a plurality of holes, and there are ridges extending between adjacent ones of the protrusions via saddle portions. In an antireflection element which is produced using the stamper 700 that has such a structure, the continuity of the effective refractive index at the interface between the antireflection element and the medium on which the light is incident (typically, air) increases so that high antireflection characteristics can be realized.

CITATION LIST

Patent Literature

Patent Document 1: Japanese PCT National Phase Laid-Open Publication No. 2005-173457
Patent Document 2: Japanese PCT National Phase Laid-Open Publication No. 2003-531962
Patent Document 3: Japanese Laid-Open Patent Publication No. 2005-156695
Patent Document 4: WO 2006/059686

Non-Patent Literature

Non-patent Document 1: Kazuya Hayashibe et al., "Under 0.05% Reflectance Optical Devices using Improved Motheye Anti-reflection Structure", SID 09 Digest, pp. 303-305

SUMMARY OF INVENTION

Technical Problem

The inventors of the present application conducted intensive researches and, as a result, found that even an antireflection element which is produced using a moth-eye mold that has ridges extending between adjacent protrusions sometimes fails to sufficiently prevent reflection of light.

The present invention was conceived in view of the above problems. One of the objects of the present invention is to provide a moth-eye mold which is for use in production of an antireflection element that is capable of sufficiently preventing reflection of light, a method of manufacturing the moth-eye mold, and a method of forming a moth-eye structure.

Solution to Problem

A mold of the present invention is a mold with a surface that has a shape which is inverse of a surface shape of a moth-eye structure, wherein the surface has a plurality of protrusions, a plurality of ridges extending between the plurality of protrusions via saddle portions, and a plurality of holes, each of which is defined by at least any three of the plurality of protrusions and ridges extending between the at least any three of the plurality of protrusions, and an average distance between centers of adjacent holes, p, and an average depth of the saddle portions, r, satisfy the relationship of $0.15 \leq r/p \leq 0.60$.

In one embodiment, the average distance p is not less than 180 nm and not more than 420 nm.

In one embodiment, an average depth of the plurality of holes, q, is not less than 380 nm and not more than 410 nm.

In one embodiment, the surface is a surface of a porous alumina layer.

A mold manufacturing method of the present invention is a method of manufacturing a mold with a surface that has a shape which is inverse of a surface shape of a moth-eye structure, including the steps of: providing a base in which aluminum is provided over a surface; and forming a porous alumina layer by performing an anodization and an etching on the aluminum, the porous alumina layer having a surface that has a plurality of protrusions, a plurality of ridges extending between the plurality of protrusions via saddle portions, and a plurality of holes, each of which is defined by at least any three of the plurality of protrusions and ridges extending between the at least any three of the plurality of protrusions, wherein in the step of forming the porous alumina layer, an average distance between centers of adjacent holes, p, and an average depth of the saddle portions, r, satisfy the relationship of $0.15 \leq r/p \leq 0.60$.

In one embodiment, in the step of forming the porous alumina layer, the average distance p is not less than 180 nm and not more than 420 nm.

In one embodiment, in the step of forming the porous alumina layer, an average depth of the plurality of holes, q, is not less than 380 nm and not more than 410 nm.

A moth-eye structure formation method of the present invention includes the steps of: manufacturing a mold according to the above-described manufacturing method; and irradiating the mold which is in contact with a photocurable resin, thereby curing the photocurable resin.

Advantageous Effects of Invention

Using a mold of the present invention enables preferred production of an antireflection element which is capable of sufficiently preventing reflection of light.

DESCRIPTION OF EMBODIMENTS

Hereinafter, embodiments of a moth-eye mold, an antireflection element produced with the use of the moth-eye mold, and manufacturing methods thereof according to the present invention are described with reference to the drawings. Note that the present invention is not limited to the embodiments which will be described below.

(Embodiment 1)

Firstly, an embodiment of a moth-eye mold 100 of the present invention is described with reference to FIG. 1. FIG. 1(a) is a bird's-eye view SEM image of the moth-eye mold 100. FIG. 1(b) is a schematic cross-sectional view of the moth-eye mold 100. The SEM image is obtained using a Scanning Electron Microscope (SEM). The bird's-eye view SEM image is an image obtained with an image capturing direction inclined relative to the direction normal to the entire surface of the moth-eye mold 100.

The moth-eye mold 100 has a surface whose shape is inverse of a surface shape of a moth-eye structure. The moth-eye mold 100 is used for production of an antireflection element which has the moth-eye structure. The surface of the moth-eye mold 100 has a plurality of protrusions, a plurality of ridges extending between the plurality of protrusions via saddle portions, and a plurality of holes, each of which is defined by at least any three of the plurality of protrusions and ridges extending between the at least any three of the plurality of protrusions. For example, each protrusion has a pointed shape, and each hole has a tapered shape. Each protrusion is provided at a position surrounded by at least three holes.

Figure 1:
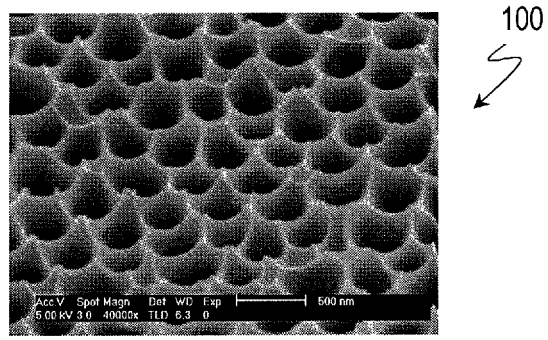
[FIG. 1] (a) is a bird's-eye view SEM image of an embodiment of a mold of the present invention. (b) is a schematic cross-sectional view of the mold shown in (a).
Figure 1:
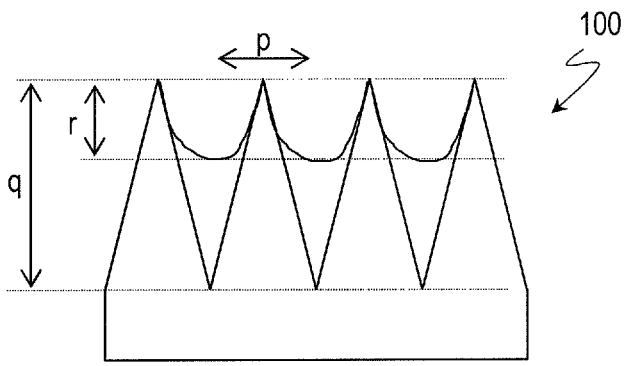

FIG. 1(*b*) shows the dimensions of the moth-eye mold 100 where p is the distance between the centers of adjacent holes, q is the depth of the holes, and r is the depth of the saddle portions. In the moth-eye mold 100, adjacent holes are provided so as to be partially connected together. The average distance between the centers of adjacent holes is generally equal to the average pore diameter of the holes. Note that, strictly speaking, the distance between the centers of adjacent holes is not constant, but the difference in the distance between the centers of any two adjacent holes is relatively small. In the following descriptions of this specification, this average distance is also simply referred to as "neighboring distance".

Now, a method of measuring the average distance between the centers of adjacent holes in the moth-eye mold 100, p, the average depth of the holes, q, and the average depth of the saddle portions, r, is described with reference to FIG. 2.

Figure 2:
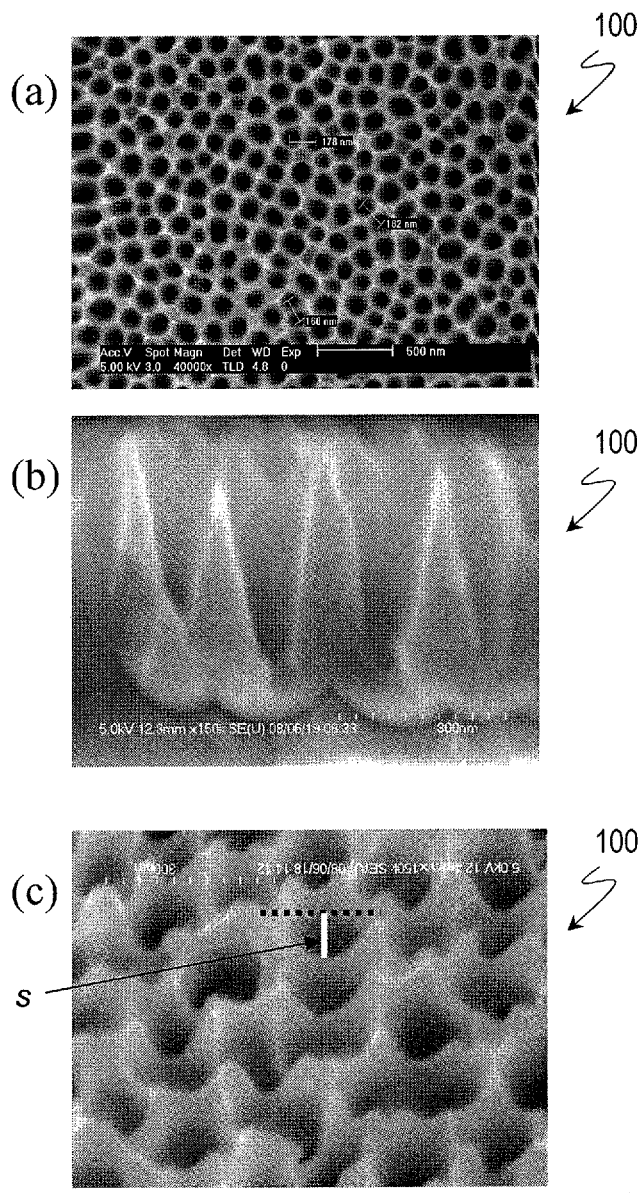
[FIG. 2] (a) is a top view SEM image of the mold of the present embodiment. (b) is a cross-sectional view SEM image of the mold shown in (a). (c) is a bird's-eye view SEM image of the mold shown in (a).

FIG. 2(*a*) is a top view SEM image of the moth-eye mold 100. In the top view SEM image, the average distance between the centers of adjacent holes, p, is obtained. As for the average distance p, for example, three holes are selected for a certain hole such that the distances between the hole centers are short, and these distances are measured. By measuring the distances between the centers of the adjacent holes for each hole and calculating the average value thereof, the average distance p is obtained. The average distance p is, for example, not less than 180 nm and not more than 420 nm. Note that the value obtained by dividing the standard deviation of the distance p by its average value is about 30%.

Typically, when seen in a direction normal to the entire surface, the ridges are extending between the vertexes of two adjacent protrusions with the shortest distances. For example, when viewing a cross-section of the saddle portions taken along a certain direction, the surface has an upward convex shape. When viewing a cross-section of the saddle portions taken along another direction, the surface has a downward concave shape. Also, typically, the surface has ridges extending between a protrusion and three other protrusions via saddle portions.

For example, there are three to six protrusions around one hole. A protrusion is provided at a position surrounded by three to six holes. Specifically, when a certain one protrusion is considered, within the range of the distance from the vertex of the certain one protrusion to the vertex of a protrusion which is closest to the vertex of the certain one protrusion, there are three to six hole centers.

FIG. 2(*b*) is a cross-sectional view SEM image of the moth-eye mold 100. In the cross-sectional view SEM image, the depths of a plurality of holes are measured, and the average value of the measurements is calculated, whereby the average hole depth q is obtained. The average hole depth q is, for example, not less than 380 nm and not more than 410 nm. Note that the value obtained by dividing the standard deviation of the depth q by its average value is about 5%.

FIG. 2(*c*) is a bird's-eye view SEM image of the moth-eye mold 100. This bird's-eye view SEM image is an image obtained with an image capturing direction inclined by 45° relative to the direction normal to the entire surface of the moth-eye mold 100. In the bird's-eye view SEM image, the distance between an imaginary straight line extending between the vertexes of two protrusions at the opposite ends of a ridge and a saddle portion, s, is obtained. The distance s is measured for each of the saddle portions, and the average value of the measurements is calculated. Thereafter, with a consideration for the fact that the bird's-eye view SEM image is an image obtained with an image capturing direction inclined by 45°, the average depth of the saddle portions, r, is obtained by calculating the product of that average value and $\sqrt{2}$. Note that, as a matter of course, the average hole depth r is smaller than the average depth of the saddle portions, q.

In the following descriptions of this specification, the average distance between the centers of adjacent holes, p, is also simply referred to as "average distance p". In the mold, the average hole depth q is also simply referred to as "depth q". Likewise, the average depth of the saddle portions, r, is also simply referred to as "depth r". Note that the value obtained by dividing the standard deviation of the depth r by its average value is about 30%.

The moth-eye mold 100 is used for production of an antireflection element. For example, the surface shape of the moth-eye mold 100 is transferred to a resin, whereby an antireflection element which has the moth-eye structure is produced. The surface of the antireflection element has a plurality of raised portions, and the raised portions of the antireflection element are formed corresponding to the holes of the mold 100. Thus, strictly speaking, in the antireflection element also, the distance between the vertexes of two adjacent raised portions is not constant, but the distance between the vertexes of any two adjacent raised portions is generally equal. This distance is, for example, not less than 180 nm and not more than 420 nm. Note that, in the following descriptions, the average distance between the centers of any adjacent raised portions in the antireflection element is also simply referred to as "neighboring distance" as is the average distance between the centers of adjacent holes in the moth-eye mold 100.

In general, as the neighboring distance of the raised portions of the antireflection element increases, the probability of light scattering at the antireflection element increases, and accordingly, the intensity of the reflected light is likely to increase. On the contrary, as the neighboring distance of the raised portions of the antireflection element decreases, the wavelength dependence of the light reflectance relatively increases, and accordingly, the hue of outgoing light is more likely to vary than that of incoming light, so that even reflection of achromatic incoming light may disadvantageously have a hue.

In the moth-eye mold 100 of the present embodiment, adjacent holes are partially connected together, and the mold has a ridge extending between protrusions. Therefore, as compared with a case where the surface of the moth-eye mold has a flat surface region, the pressing force applied in production of an antireflection element according to a transfer method can be reduced, and the mold releasability can be improved, so that the production yield can be improved.

Furthermore, in the moth-eye mold 100 of the present embodiment, the ratio of the average distance p between the centers of adjacent holes and the average depth r of the saddle portions, r/p, satisfies the relationship of $0.15 \leq r/p \leq 0.60$. The ratio r/p depends on the shape of the protrusions of the moth-eye mold 100. As the ratio r/p increases, i.e., as r increases while p is constant, or as p decreases while r is constant, the protrusions become more sharply tapered. When the ratio r/p satisfies the above relationship, an antireflection element which is produced using the moth-eye mold 100 is capable of sufficiently preventing reflection of light, although the specific descriptions will be provided in a later section.

Figure 3:
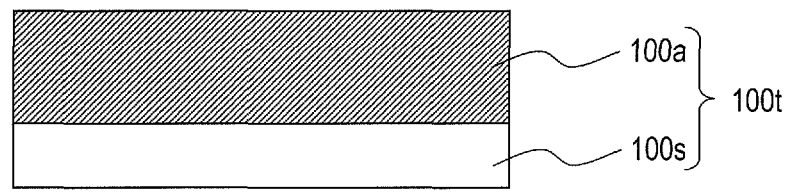
[FIGS. 3] (a) and (b) are schematic diagrams showing an embodiment of a mold manufacturing method of the present invention.
Figure 3:
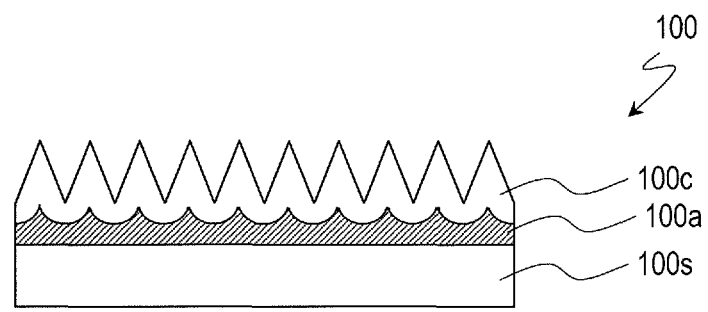

The moth-eye mold 100 which has the above-described configuration is manufactured as described below. Hereinafter, a method of manufacturing the moth-eye mold 100 is described with reference to FIG. 3.

Firstly, as shown in FIG. 3(a), a base 100t is provided which has a surface that is made of aluminum 100a. The base 100t which has such a configuration may be prepared by, for example, depositing an aluminum film 100a on an insulating substrate (typically, glass substrate) 100s. The thickness of the aluminum film 100a may be, for example, 1.0 μm. Note that, as the base 100t, a bulk of aluminum may be used.

Then, anodization and etching are performed, whereby part of the aluminum film 100a of the base 100t is changed into a porous alumina layer 100c as shown in FIG. 3(b). In the porous alumina layer 100c, the average distance between the centers of adjacent holes, p, and the average depth of the saddle portions, r, satisfy the relationship of $0.15 \leq r/p \leq 0.60$. In this way, the moth-eye mold 100 is manufactured.

Figure 4:
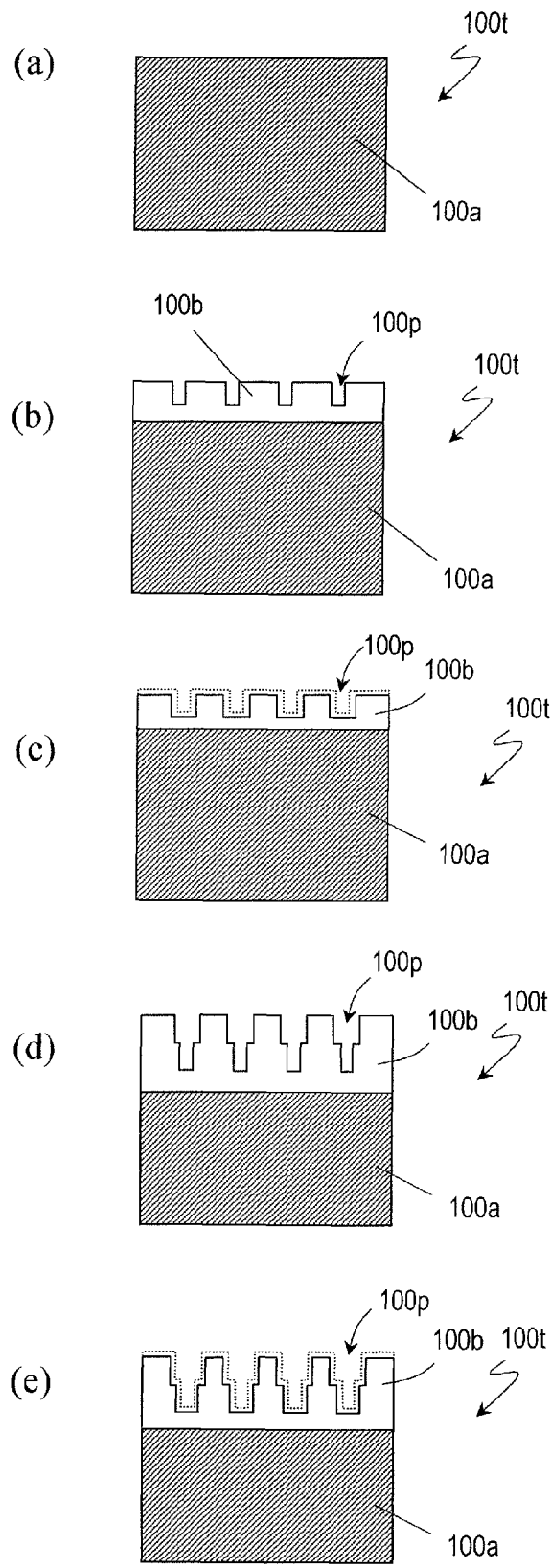
[FIG. 4] (a) to (e) are schematic diagrams illustrating a method of forming a porous alumina layer in a moth-eye mold of the present embodiment.

Now, a method of forming the porous alumina layer 100c is described with reference to FIG. 4.

First, as shown in FIG. 4(a), a base 100t is provided which has an aluminum film 100a over its surface.

Then, the base 100t is anodized so as to form a porous alumina layer 100b which has micropores 100p extending perpendicular to the surface of the base 100t as shown in FIG. 4(b). By the anodization, oxidation and dissolution of the aluminum film 100a concurrently advance at the surface of the base 100t so that the micropores 100p extending perpendicular to the surface of the base 100t are formed.

For example, the anodization may be realized by immersing a base in an acidic electrolytic solution of sulfuric acid, oxalic acid, phosphoric acid, or the like, or an alkaline electrolytic solution, and applying a voltage with the base being used as an anode. In this process, the average distance between the centers of adjacent micropores and the depth of the micropores vary depending on the conditions of the anodization. Note that the average distance between the centers of adjacent micropores is approximately twice the thickness of a barrier layer, and is approximately proportional to the voltage that is applied during the anodization. The average distance between the centers of micropores is within the range of 180 nm to 420 nm, for example. The pore diameter of the micropores depends on the type, concentration, temperature, etc., of the electrolytic solution. The micropores are preferably arranged with a regularity degraded to some extent. Note that, however, the micropores may be in an irregular (i.e., non-periodic) arrangement or may be in a regular arrangement.

For example, in the case of forming holes whose average distance p is 180 nm, the anodization is performed for 25 seconds with the forming voltage of 80 V using an electrolytic solution of 0.6 wt % oxalic acid at the solution temperature of 5° C. In the case of forming holes whose average distance p is 400 nm, the anodization is performed for 30 to 45 seconds with the forming voltage of 200 V using an electrolytic solution of 2 wt % tartaric acid at the solution temperature of 5° C.

Then, the etching is performed, whereby the pore diameter of the micropores 100p is increased as shown in FIG. 4(c). The etching may be performed for several tens of minutes using 1 mol/L phosphoric acid at the solution temperature of 30° C.

Then, the aluminum 100a is again partially anodized such that the micropores 100p are grown in the depth direction and the thickness of the porous alumina layer 100b is increased as shown in FIG. 4(d). Here, the growth of the micropores 100p starts at the bottom of the previously-formed micropores 100p, so that the lateral surface of the micropores 100p has a stepped shape.

Thereafter, when necessary, the porous alumina layer 100b is further etched such that the pore diameter of the micropores 100p is further increased as shown in FIG. 4(e). The etching is performed concurrently with the above-described etching. In this way, the porous alumina layer 100c shown in FIG. 3(b) is obtained.

The anodization and the etching are repeatedly performed through a plurality of cycles till adjacent holes are partially connected together. Note that this process preferably ends with the anodization rather than the etching. In that case, the bottom point of the holes is relatively narrow.

Figure 5:
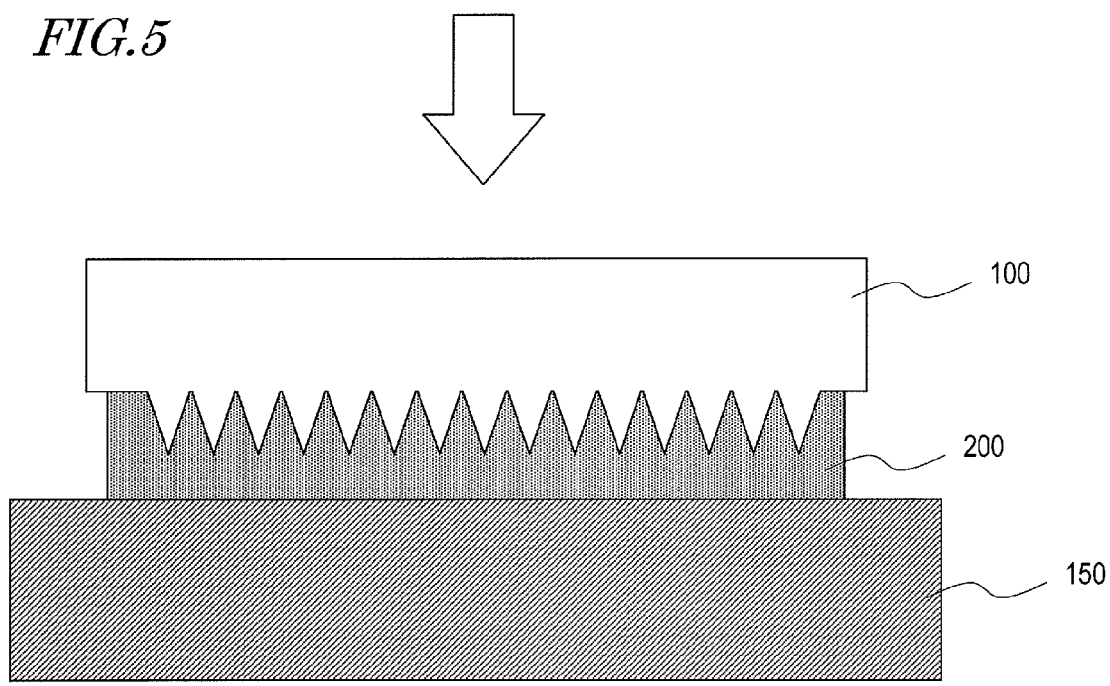
[FIG. 5] A schematic diagram showing an embodiment of an antireflection element production method of the present invention.

Hereinafter, a method of producing the antireflection element 200 is described with reference to FIG. 5.

Firstly, the moth-eye mold 100 and a work 150 are provided.

Then, a photocurable resin which is provided between the moth-eye mold 100 and the work 150 is irradiated with light (e.g., ultraviolet light) such that the photocurable resin is cured, whereby the antireflection element 200 is produced. The work 150 may be, for example, a flexible polymer film. Specifically, the polymer film may be, for example, a TAC (triacetylcellulose) film. The photocurable resin may be, for example, an acrylic resin. The viscosity of the acrylic resin may be 500±200 cP. The shrinkage rate of the cured acrylic resin may be about 10%. The transfer may be performed with the pressure of not more than 20 kg/cm². For example, the pressure may be 20 kg/cm² or may be 10 kg/cm². Alternatively, the transfer may be manually performed. The pressure applied may be not more than 1 kg/cm².

For example, a photocurable resin is provided between the moth-eye mold 100 and the work 150. The photocurable resin may be provided over the surface of the work 150 or may be provided over the surface of the moth-eye mold 100. The photocurable resin may be dropped onto the moth-eye mold 100, and thereafter, a TAC film may be placed over the moth-eye mold 100 using a roller in such a manner that air voids are not formed in the resin. Then, the photocurable resin is irradiated with light (e.g., ultraviolet light) which is supplied through the moth-eye mold 100 such that the photocurable resin is cured. For example, the irradiation of light is performed using i-line (365 nm). The irradiation energy is not less than 100 mJ/cm² and not more than 3 J/cm². For example, it may be 2 J/cm².

In general, the resin that is to form the antireflection element shrinks in the curing process. Therefore, the height of the raised portions of the antireflection element is smaller than the depth of the holes of the moth-eye mold. Note that, although the specific descriptions will be provided in a later section, when the depth of the saddle portions of the mold is relatively small, the height of the raised portions of the antireflection element is generally constant depending on the depth of the holes of the mold. If the saddle portions of the mold have somewhat great depths, the resin that is to form the antireflection element remains in part of the mold corresponding to the saddle portions, so that the height of the raised portions decreases.

For example, the cured resin rarely absorbs light. Specifically, the relative transmittance of the cured resin to the air for visible light (wavelength: 380 nm to 780 nm) is not less than 90%. The cured resin preferably has high reliability. For example, even after the cured resin is left in a high temperature condition (e.g., 95° C.) or a low temperature condition (e.g., −40° C.) for a long period of time (e.g., 500 hours), no change is detected by a human eye at the surface in a room temperature condition. Even after the cured resin undergoes a great temperature change (for example, from −40° C. for 30 minutes to 85° C. for 30 minutes) multiple times (e.g., 100 times), no change is detected at the surface at least by a human eye. Furthermore, even after the cured resin is left in a high temperature, high humidity condition (e.g., temperature: 60° C., humidity: 95%) for a long period of time (e.g., 100 hours), no change is detected at the surface at least by a human eye. The pencil hardness number of this resin is 1H or higher.

Thereafter, the moth-eye mold 100 is separated from the antireflection element 200. In this way, the antireflection element 200 which has the moth-eye structure can be produced. The surface of the antireflection element 200 has a plurality of raised portions. For example, the raised portions have a generally conical shape. The refractive index of the antireflection element 200 is, for example, 1.5.

As previously described, in the moth-eye mold 100 of the present embodiment, adjacent holes are partially connected together, and the mold has a ridge extending between adjacent protrusions via a saddle portion. In the antireflection element 200 which is produced using the moth-eye mold 100 that has such a configuration, there is no flat surface region between the raised portions, so that the refractive index of light coming in the antireflection element 200 continuously varies, and reflection is prevented.

Now, the advantages of the mold 100 and the antireflection element 200 of the present embodiment over a moth-eye mold 500 and an antireflection element 600 of Comparative Example 1 are described with reference to FIG. 6 and FIG. 7.

First, the moth-eye mold 500 and the antireflection element 600 of Comparative Example 1 are described with reference to FIG. 6. FIG. 6(*a*) is a schematic plan view of the moth-eye mold 500. FIG. 6(*b*) is a schematic cross-sectional view of the mold 500. The surface of the moth-eye mold 500 does not have a saddle portion. The surface of the mold 500 has flat surface regions, each of which is surrounded by three holes.

Figure 6:
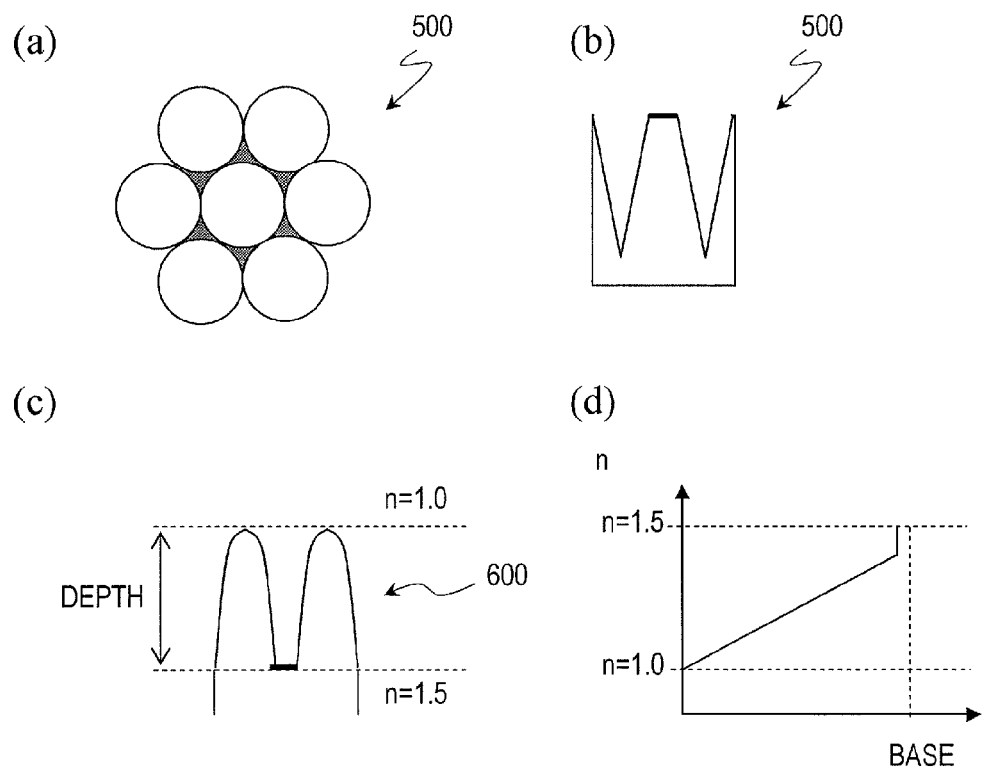
[FIG. 6] (a) is a schematic plan view of a moth-eye mold of Comparative Example 1. (b) is a schematic cross-sectional view of the mold shown in (a). (c) is a schematic cross-sectional view of an antireflection element of Comparative Example 1. (d) is a graph showing a variation of the effective refractive index at the interface between the antireflection element of (c) and the air.

FIG. 6(*c*) is a schematic cross-sectional view of the antireflection element 600 which is produced using the moth-eye mold 500. The surface of the antireflection element 600 is formed corresponding to the surface of the moth-eye mold 500. Note that, herein, for the sake of simplicity, the shape of the raised portions of the antireflection element 600 is shown so as to coincide with a shape which is defined by the holes of the moth-eye mold 500, although it is not exactly correct. As shown in FIG. 6(*a*) and FIG. 6(*b*), the surface of the moth-eye mold 500 has flat surface regions, each of which is surrounded by three holes. The surface of the antireflection element 600 also has flat surface regions between the raised portions. In this case, the effective refractive index abruptly changes at the flat surface region as shown in FIG. 6(*d*), so that reflection of light cannot be sufficiently prevented.

Then, the moth-eye mold 100 and the antireflection element 200 of the present embodiment are described with reference to FIG. 7. FIG. 7(*a*) is a schematic plan view of the moth-eye mold 100. FIG. 7(*b*) is a schematic cross-sectional view of the moth-eye mold 100. The surface of the moth-eye mold 100 has protrusions, each of which is surrounded by at least three holes, and ridges extending between adjacent protrusions.

Figure 7:
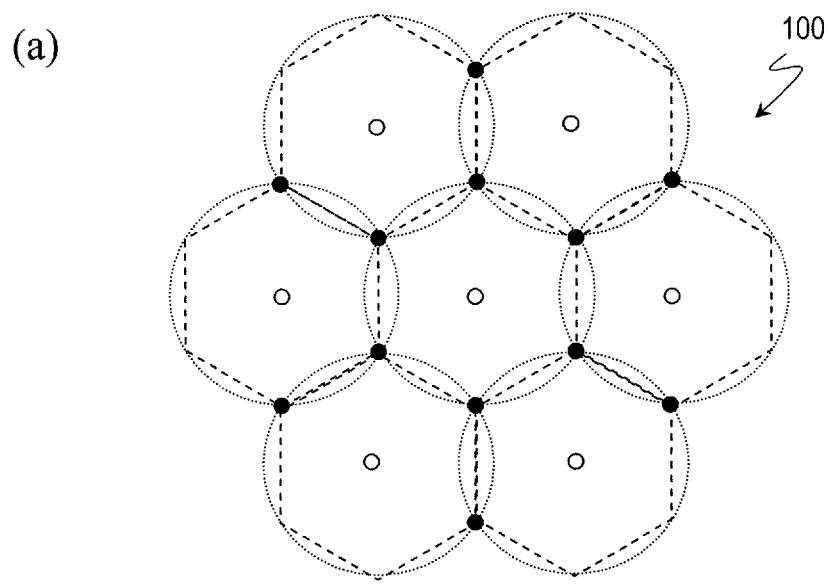
[FIG. 7] (a) is a schematic plan view of a mold of the present embodiment. (b) is a schematic cross-sectional view of the mold shown in (a). (c) is a schematic cross-sectional view of an antireflection element of the present embodiment. (d) is a graph showing a variation of the effective refractive index at the interface between the antireflection element of (c) and the air.
Figure 7:
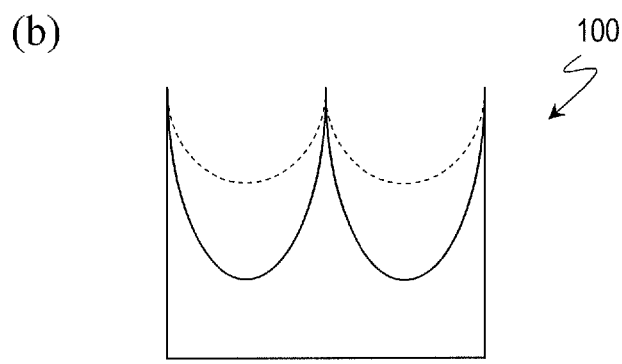
Figure 7:
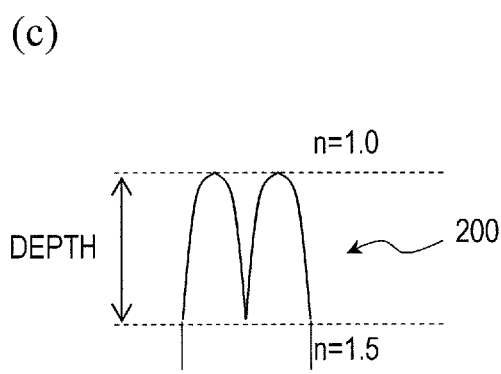
Figure 7:
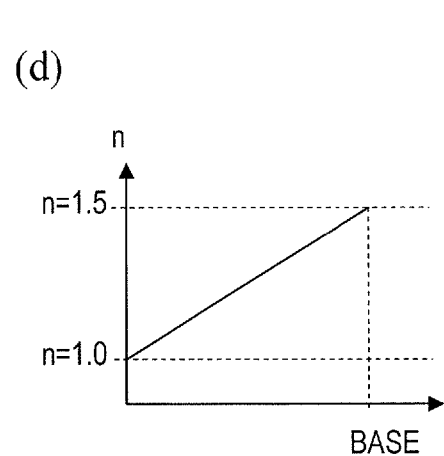

FIG. 7(*c*) is a schematic cross-sectional view of the antireflection element 200 which is produced using the moth-eye mold 100. The surface of the antireflection element 200 is formed corresponding to the surface of the moth-eye mold 100. Note that, herein also, for the sake of simplicity, the shape of the raised portions of the antireflection element 200 is shown so as to coincide with a shape which is defined by the holes of the moth-eye mold 100. In contrast to the antireflection element 600 shown in FIG. 6(*c*), the surface of the antireflection element 200 does not have a flat surface region between the raised portions. In this case, the effective refractive index moderately changes along the height direction of the raised portions as shown in FIG. 7(*d*), and as a result, reflection of light is sufficiently prevented.

In the above descriptions which have been provided with reference to FIG. 6 and FIG. 7, the shape of the raised portions of the antireflection element coincides with a shape which is defined by the holes of the mold for the sake of simplicity. However, strictly speaking, the shape of the raised portions of the antireflection element does not coincide with a shape which is defined by the holes of the mold. Thus, merely using a mold which has saddle portions in the surface does not realize an antireflection element which is capable of sufficiently preventing reflection.

Now, the advantages of the moth-eye mold 100 and the antireflection element 200 of the present embodiment over a moth-eye mold 300A and an antireflection element 400A of Comparative Example 2 and a moth-eye mold 300B and an antireflection element 400B of Comparative Example 3 are described with reference to FIG. 8.

Figure 8:
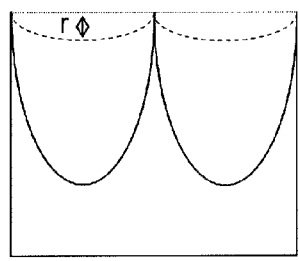
[FIG. 8] (a) is a schematic cross-sectional view of a moth-eye mold of Comparative Example 2. (b) is a schematic cross-sectional view of an antireflection element of Comparative Example 2 which is produced using the mold shown in (a). (c) is a schematic cross-sectional view of a moth-eye mold of Comparative Example 3. (d) is a schematic cross-sectional view of an antireflection element of Comparative Example 3 which is produced using the mold shown in (c). (e) is a schematic cross-sectional view of a moth-eye mold of the present embodiment. (f) is a schematic cross-sectional view of an antireflection element of the present embodiment which is produced using the mold shown in (e).
Figure 8:
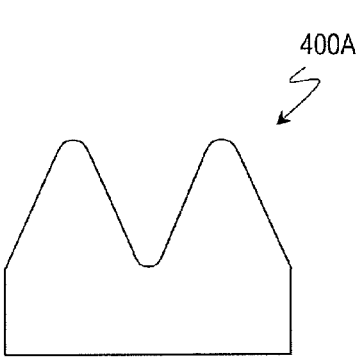
Figure 8:
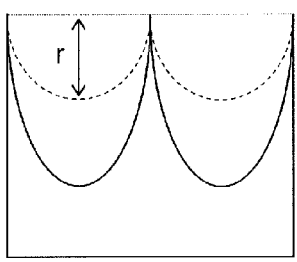
Figure 8:
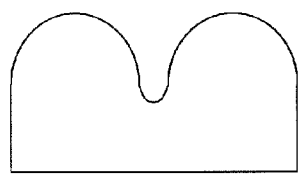
Figure 8:
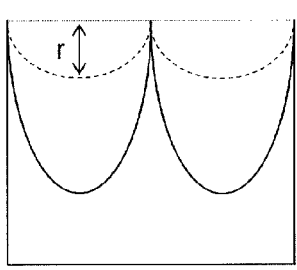
Figure 8:
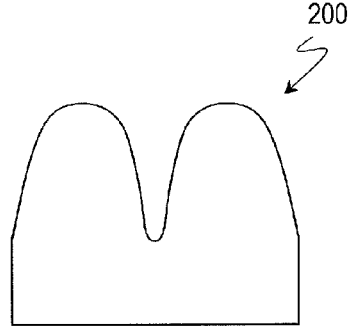
Figure 9:
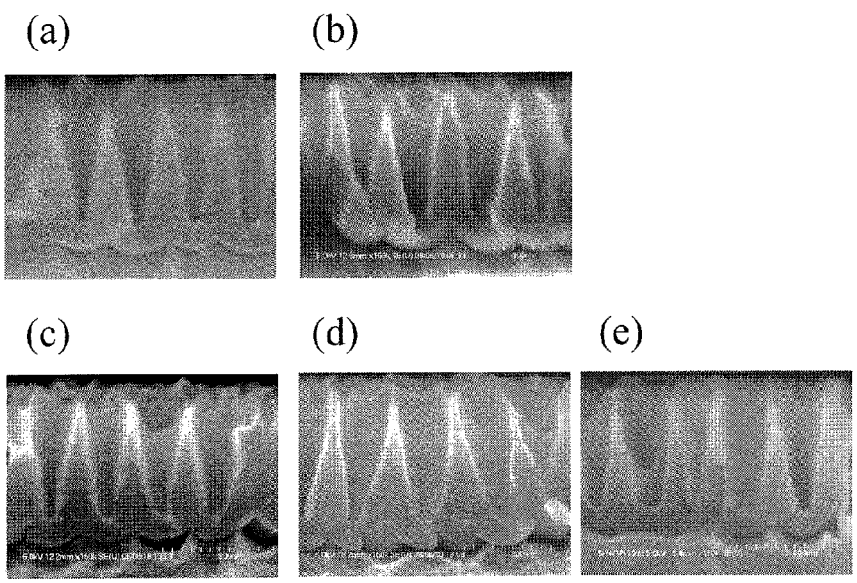
[FIG. 9] (a) to (e) are cross-sectional SEM images of molds a to e.
Figure 10:
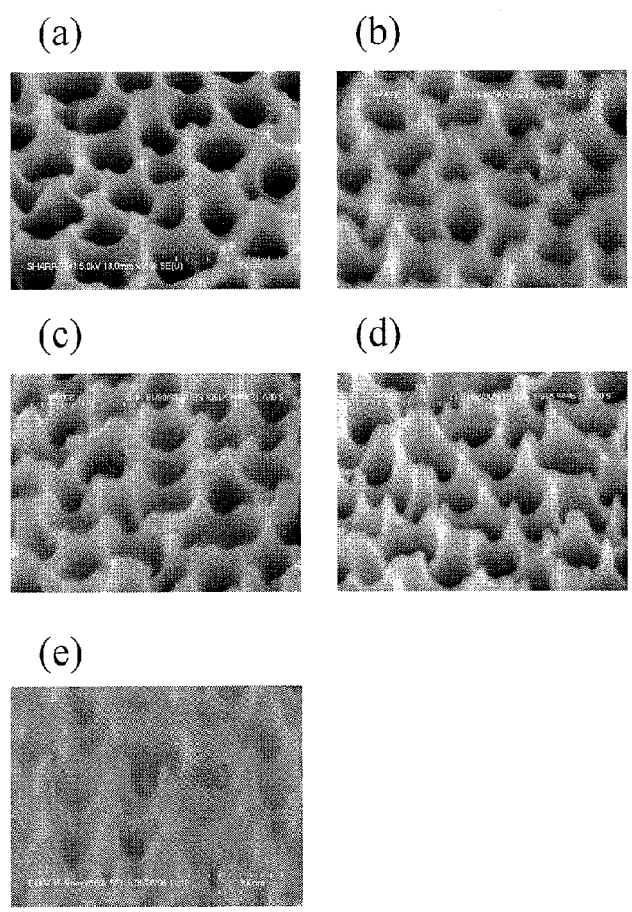
[FIG. 10] (a) to (e) are bird's-eye view SEM images of the molds a to e, which were obtained with an image capturing direction inclined by 45° relative to the direction normal to the entire mold surface.
Figure 11:
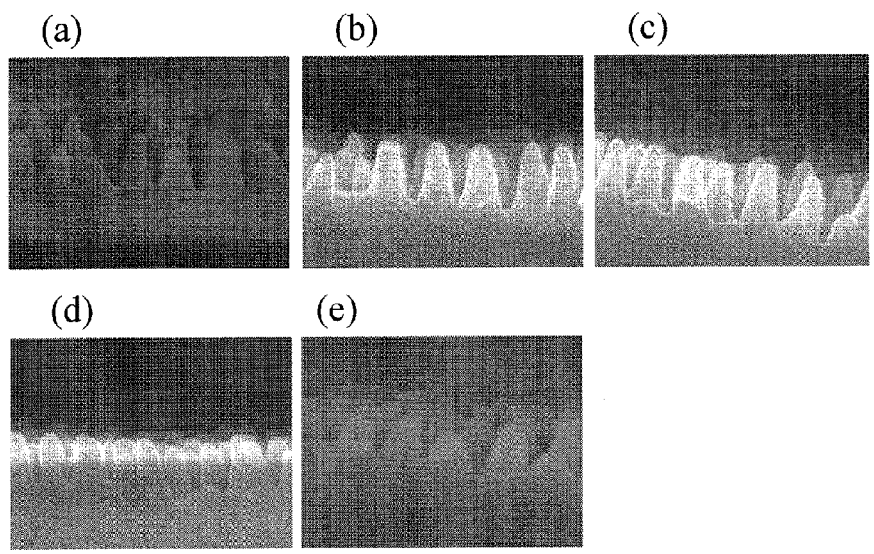
[FIG. 11] (a) to (e) are cross-sectional SEM images of antireflection elements A to E.

FIG. 8(*a*) is a schematic cross-sectional view of the moth-eye mold 300A of Comparative Example 2. The moth-eye mold 300A has saddle portions. The depth of the saddle portions, r, is small relative to the average distance between the centers of adjacent holes, p. The slope of the protrusions is relatively moderate. In the moth-eye mold 300A, the average distance p and the saddle portion depth r satisfy the relationship of r/p<0.15.

FIG. 8(*b*) shows the antireflection element 400A of Comparative Example 2. The antireflection element 400A is produced using the moth-eye mold 300A. Since the slope of the protrusions of the moth-eye mold 300A is relatively moderate as described above, the antireflection element 400A has generally flat surface regions between the raised portions. As a result, the effective refractive index abruptly changes in the vicinity of the bottom surface of the antireflection element 400A in the same fashion as that shown in FIG. 6(*d*). Thus, the antireflection element 400A cannot sufficiently prevent reflection of light.

In the antireflection element 400A, the slope of the raised portions is generally constant from the vertex to the base of the raised portions. In this case, the rate of the change of the effective refractive index increases along the direction from the vertex to the base of the raised portions. When the rate of the change of the effective refractive index relatively largely varies in this way, reflection cannot be sufficiently prevented. When the average distance p is short, the hue of light reflected by the antireflection element 400A is different from that of incoming light.

FIG. 8(*c*) is a schematic cross-sectional view of the moth-eye mold 300B of Comparative Example 3. The moth-eye mold 300B has saddle portions. The depth of the saddle portions, r, is large relative to the average distance between the centers of adjacent holes, p. The slope of the protrusions is relatively steep. In the moth-eye mold 300B, the average distance p and the saddle portion depth r satisfy the relationship of 0.60<r/p.

FIG. 8(*d*) shows the antireflection element 400B of Comparative Example 3. The antireflection element 400B is produced using the moth-eye mold 300B. Since the slope of the protrusions of the moth-eye mold 300B is relatively steep as described above, a region between the raised portions of the antireflection element 400B is relatively high. Therefore, even when the moth-eye molds 300A and 300B have generally equal hole depths, the raised portions of the antireflection element 400B are shorter than the raised portions of the antireflection element 400A, and the aspect ratio of the raised portions of the antireflection element 400B is smaller. Thus, the antireflection element 400B cannot sufficiently prevent reflection of light.

In the antireflection element 400B, the half-value width of the raised portions is much greater than a half of the distance between the centers of the raised portions. The slope of the raised portions from the vertex to the base of the raised portions is moderate, and the rate of the change of the slope is relatively large. In this case, the rate of the change of the effective refractive index decreases along the direction from the vertex to the base of the raised portions. When the rate of the change of the effective refractive index relatively largely varies in this way, reflection cannot be sufficiently prevented.

FIG. 8(e) is a schematic cross-sectional view of the moth-eye mold 100 of the present embodiment. In the moth-eye mold 100, the average distance between the centers of adjacent holes, p, and the saddle portion depth r satisfy the relationship of $0.15 \le r/p \le 0.60$.

FIG. 8(f) shows the antireflection element 200 of the present embodiment. The antireflection element 200 is produced using the moth-eye mold 100. Here, the raised portions of the antireflection element 200 have a generally equal height to that of the raised portions of the antireflection element 400A of Comparative Example 2. In the antireflection element 200, the raised portions can have a bell-like shape while the aspect ratio of the raised portions is maintained high.

Thus, in the moth-eye mold 100 of the present embodiment, the average distance between the centers of adjacent holes, p, and the saddle portion depth r satisfy the relationship of $0.15 \le r/p \le 0.60$. This configuration enables sufficient prevention of light reflection.

Hereinafter, molds among which the average distance between hole centers (neighboring distance), p, the hole depth q, and the saddle portion depth r were different, and antireflection elements which were produced using such molds are described. Firstly, molds a to e, which have generally equal neighboring distances p of the holes and generally equal average hole depths q but have different average depths r of the saddle portions, and the characteristics of antireflection elements which were produced using the molds a to e, are described.

The mold a is manufactured as follows. First, a square glass substrate of 5 cm on each side is provided, and a 1.0 μm thick aluminum film is deposited on the glass substrate, whereby a base is formed.

Then, the anodization is performed on the base, whereby a porous alumina layer which has micropores is formed. Here, the anodization is performed for 25 seconds with the forming voltage of 80 V using a 0.6 wt % oxalic acid electrolytic solution at the solution temperature of 5° C., whereby micropores with the neighboring distance p of 180 nm are formed.

Then, the etching is performed for 19 minutes using 1 mol/L phosphoric acid at the solution temperature of 30° C. This etching increases the pore diameter of the micropores.

The anodization and the etching are repeatedly performed till adjacent holes are partially connected together. Specifically, 5 cycles of the anodization and 4 cycles of the etching process are alternately performed. In this way, the mold a is manufactured. In the mold a, the neighboring distance p of the holes is approximately 180 nm, and the average hole depth q is approximately 380 nm.

The molds b to e are manufactured in the same way as the mold a except that the etching duration is different. The etching durations for the molds b to e are 21 minutes, 23 minutes, 25 minutes, and 30 minutes, respectively.

FIGS. 9(a) to 9(e) are the cross-sectional view SEM images of the molds a to e. FIGS. 10(a) to 10(e) are bird's-eye view SEM images of the molds a to e, which were obtained with an image capturing direction inclined by 45° relative to the direction normal to the entire mold surface. Table 1 shows the etching duration for manufacture of the molds a to e, and the neighboring distance p, the hole depth q, and the saddle portion depth r of the molds a to e.

TABLE 1

|  | Mold | | | | |
|---|---|---|---|---|---|
|  | a | b | c | d | e |
| Etching Duration (min) | 19 | 21 | 23 | 25 | 30 |
| p | 181 | 185 | 182 | 181 | 182 |
| q | 380 | 385 | 380 | 381 | 386 |
| r | 26.7 | 62.6 | 85 | 104.8 | 159.8 |

Although not shown herein, in the top view SEM images of the molds a to e, the distances from the center of each hole to the centers of the three nearest holes are measured, and the average value of the measured distances is referred to as "neighboring distance p". The hole depth q is obtained in the cross-sectional view SEM image. The saddle portion depth r is obtained as follows. In a 45°-inclined bird's-eye view SEM image, the distance from an imaginary line extending between the vertexes of two protrusions provided around a certain hole to the saddle portion is measured at 20 positions, and the average value of the measured distances is obtained. In consideration of the fact that the bird's-eye view SEM image is an image obtained with an image capturing direction inclined by 45° relative to the direction normal to the mold surface, the average value is multiplied by $\sqrt{2}$. The product is the saddle portion depth r.

In each of the molds a to e, the neighboring distance p of the holes is approximately 180 nm, and the hole depth is approximately 380 nm. On the other hand, the molds a to e have different saddle portion depths r. As the etching duration increases, the saddle portion depth r becomes greater.

The molds a to e which have such configurations are used to manufacture antireflection elements A to E. The production of the antireflection elements A to E is realized by transferring the surface shape of the molds a to e to the curable resin as previously described. The raised portions of the antireflection elements A to E are formed corresponding to the holes of the molds a to e.

FIGS. 11(a) to 11(e) show the cross-sectional view SEM images of the antireflection elements A to E, respectively. The raised portions of the antireflection elements A to E are formed corresponding to the holes of the molds a to e.

Figure 12:
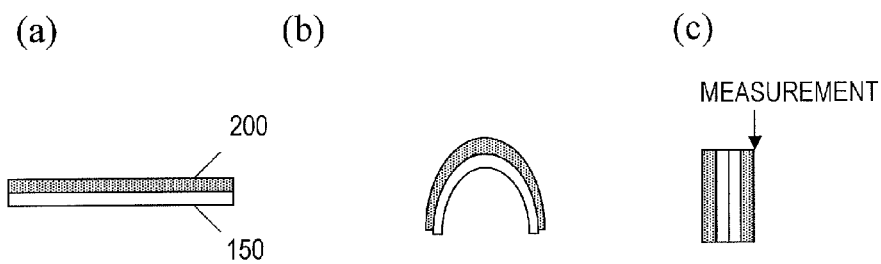
[FIG. 12] (a) to (c) are schematic views illustrating a measurement method for the cross-sectional SEM images of the antireflection elements A to E.

The structure of the antireflection elements is measured as described below. Hereinafter, a method of measuring the antireflection elements is described with reference to FIG. 12.

First, the antireflection element 200 which is formed on the work 150 as shown in FIG. 12(a) is provided.

Then, the work 150 and the antireflection element 200 are bent as shown in FIG. 12(b), whereby the bent element is split into two parts, so that a cross section of the antireflection element 200 is exposed. Thereafter, gold is deposited on the cross section of the antireflection element 200.

Thereafter, an image of the cross section of the antireflection element 200 is captured by SEM as shown in FIG. 12(c). In the cross-sectional view SEM image, the height of the raised portions is measured at several positions and the average of the measurements is obtained. Meanwhile, the average of the widths of the raised portions at a level where the height of the raised portions is halved (half-value width) is obtained. Note that, in the following descriptions, the average height of the raised portions of the antireflection element, T, is also simply referred to as "depth T". Likewise, the average half-value width HW of the raised portions is also simply referred to as "half-value width HW".

Table 2 shows the height T and the half-value width HW of the raised portions of the antireflection elements A to E.

TABLE 2

|  | Antireflection Element | | | | |
|---|---|---|---|---|---|
|  | A | B | C | D | E |
| Height of raised portions T (nm) | 220 | 228 | 220 | 204 | 172 |
| Half-value width HW (nm) | 90 | 96 | 98 | 102 | 104.6 |

In the antireflection elements A to E, the neighboring distance p of the raised portions is generally equal to the neighboring distance of the holes of the molds a to e, which is approximately 180 nm. On the other hand, among the antireflection elements A to E, the height T and the half-value width HW of the raised portions are different.

First, the height T of the raised portions is considered. The raised portions of the antireflection elements A to C have generally equal heights T. Since the neighboring distance p of the raised portions is approximately 180 nm as described above, the raised portions of the antireflection elements A to C have generally equal aspect ratios. The height T of the raised portions of the antireflection element D is smaller than the height T of the raised portions of the antireflection elements A to C. The height T of the raised portions of the antireflection element E is smaller than the height T of the raised portions of the antireflection element D.

Next, the half-value width HW of the raised portions is considered. The antireflection elements A to E have different half-value widths HW. As described above, the neighboring distance p of the raised portions of the antireflection elements A to E is approximately 180 nm. In the antireflection element A, the half-value width HW of the raised portions is 90 nm. The raised portions of the antireflection element A have a generally conical shape. On the other hand, in the antireflection elements B to E, the half-value width HW of the raised portions is greater than 90 nm, and the raised portions have a bell-like shape. Comparing the antireflection elements B to E, the raised portions have deformed shapes with decreasing heights in order of the antireflection elements B, C, D and E.

Next, the reflection characteristics of the antireflection elements A to E are measured. The measurement of the reflection characteristics is performed with the antireflection elements A to E being placed over a black acrylic plate. For example, the standard illuminant $D_{65}$ as the light source and the spectrocolorimeter CM-2600d manufactured by KONICA MINOLTA HOLDINGS, INC. are used to define the object color of each of the antireflection elements A to E based on the transmittance characteristics of the standard illuminant $D_{65}$ relative to the XYZ color space weighing coefficients. Thereafter, the Y value, the L* value, a*, b* and the chroma C* of the reflected light from the antireflection elements A to E are measured.

Figure 13:
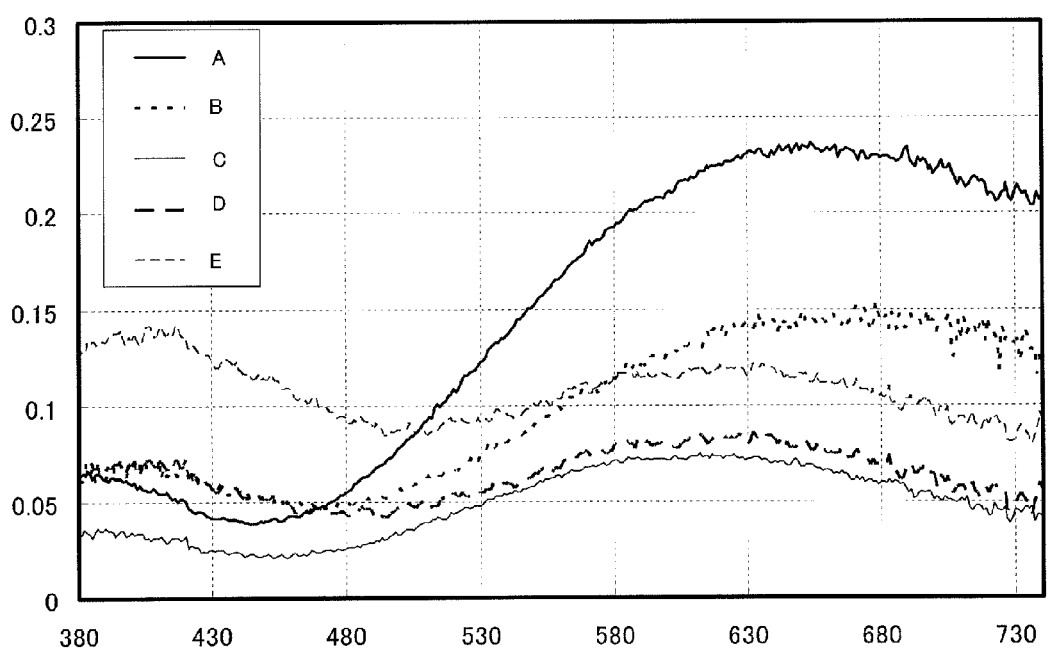
[FIG. 13] A graph showing the reflection spectrums of the antireflection elements A to E.

FIG. 13 shows the reflection spectrums of the antireflection elements A to E. In the reflection spectrum of the antireflection element A, the reflectance in a long-wavelength range is relatively high, and the reflectance largely depends on the wavelength. In the reflection spectrum of the antireflection element E, the wavelength dependence of the reflectance is relatively low, but the reflectance itself is relatively high. On the other hand, in the reflection spectrums of the antireflection elements B to D, the reflectance is relatively low, and the wavelength dependence is relatively small.

Table 3 shows the height T and the half-value width HW of the raised portions of the antireflection elements A to E and the Y value, the value, a*, b* and C* of the reflected light from the antireflection elements A to E.

TABLE 3

|  | Antireflection Element | | | | |
|---|---|---|---|---|---|
|  | A | B | C | D | E |
| Height of raised portions T (nm) | 220 | 228 | 220 | 204 | 172 |
| Half-value width HW (nm) | 90 | 96 | 98 | 102 | 104.6 |
| Y value | 0.2903 | 0.2608 | 0.1932 | 0.2032 | 0.2806 |
| L* value | −2.534 | −4.563 | −6.347 | −5.884 | −4.254 |
| a* | 1.610 | 2.003 | 0.548 | 1.262 | 1.461 |
| b* | 7.601 | 3.416 | 4.055 | 1.380 | −0.443 |
| C* | 7.770 | 3.960 | 4.092 | 1.870 | 1.527 |

As a result of the measurement, the reflection intensities of the antireflection elements A and E are higher than those of the antireflection elements B to D. In the antireflection element A, the half-value width HW of the raised portions is small, and the raised portions have a generally conical shape. Therefore, the rate of the change of the effective refractive index along the height direction of the raised portions relatively largely varies, and as a result, the antireflection element A cannot sufficiently prevent reflection.

In the antireflection element E, the height T of the raised portions is small relative to the neighboring distance p of the raised portions, so that the aspect ratio of the raised portions is small. In the antireflection element E, the half-value width HW of the raised portions is relatively large, and the rate of the change of the effective refractive index along the height direction of the raised portions relatively largely varies. Thus, the antireflection element E cannot sufficiently prevent reflection.

The antireflection elements A to E were irradiated with achromatic light, and reflection of the light was observed by a human eye. The reflection from the antireflection element A was perceived as having a color, whereas coloring of the reflections from the antireflection elements B to E was not perceived. Therefore, to prevent coloring of the reflected light, the C* value of the reflection is preferably not more than 5.0.

Table 4 shows the etching duration for manufacture of the molds a to e, the neighboring distance p of the holes, the hole depth q, the saddle portion depth r, r/p and r/q in the molds a to e, the height T and the half-value width HW of the raised portions in the antireflection elements A to E which were produced using the molds a to e, and the Y value, the L* value, a*, b* and C* of the reflected light from the antireflection elements A to E.

TABLE 4

| | Mold | | | | |
|---|---|---|---|---|---|
| | a | b | c | d | e |
| Etching Duration (min) | 19 | 21 | 23 | 25 | 30 |
| p | 181 | 185 | 182 | 181 | 182 |
| q | 380 | 385 | 380 | 381 | 386 |
| r | 26.7 | 62.6 | 85 | 104.8 | 159.8 |
| r/p | 0.148 | 0.338 | 0.467 | 0.580 | 0.878 |
| r/q | 0.070 | 0.163 | 0.224 | 0.275 | 0.414 |

| | Antireflection Element | | | | |
|---|---|---|---|---|---|
| | A | B | C | D | E |
| T (nm) | 220 | 228 | 220 | 204 | 172 |
| HW (nm) | 90 | 96 | 98 | 102 | 104.6 |
| Y value | 0.290 | 0.261 | 0.193 | 0.203 | 0.281 |
| L* value | −2.534 | −4.563 | −6.347 | −5.884 | −4.254 |
| a* | 1.610 | 2.003 | 0.548 | 1.262 | 1.461 |
| b* | 7.601 | 3.416 | 4.055 | 1.380 | −0.443 |
| C* | 7.770 | 3.960 | 4.092 | 1.870 | 1.527 |

Since the resin that is to form the antireflection elements A to E shrinks in the curing process, the height T of the raised portions of the antireflection elements A to E is smaller than the hole depth q of the moth-eye molds a to e. Note that, in the moth-eye molds a to c, the saddle portion depth r is relatively small, and therefore, the height T of the raised portions of the antireflection elements A to C is generally constant. However, in the moth-eye molds d and e, the saddle portion depth r is relatively large. Therefore, in the transfer process, the resin that is to form the antireflection elements D and E remains in part of the molds d and e corresponding to the saddle portions, so that the height T of the raised portions decreases.

As the saddle portion depth r of the molds a to e increases, the half-value width HW of the raised portions in the antireflection elements A to E increases. As the saddle portion depth r of the mold increases, a larger amount of the resin remains in regions between the raised portions of the antireflection element. As a result, the raised portions of the antireflection element have deformed shapes with decreased heights.

In the moth-eye mold a, the saddle portion depth r is small, and accordingly, the half-value width HW of the raised portions of the antireflection element A is short. As described above, the raised portions of the antireflection element A has a generally conical shape. The rate of the change of the effective refractive index along the height direction of the raised portions relatively largely varies. As a result, the antireflection element A cannot sufficiently prevent reflection.

As described above, the height T of the raised portions in the antireflection elements D and E is low as compared with the antireflection elements A to C. Particularly, the height T of the raised portions of the antireflection element E corresponding to the mold e that has a large saddle portion depth r is small. As described above, in the antireflection element E, the height T of the raised portions is small relative to the neighboring distance p of the raised portions, and the half-value width HW is large. Thus, the antireflection element E cannot sufficiently prevent reflection.

In general, when the neighboring distance p of the raised portions of the antireflection element is relatively short, the Y value is relatively low, but the probability of coloring of reflected light is high. According to the present embodiment, the neighboring distance p of the holes and the saddle portion depth r in the moth-eye mold satisfy the relationship of $0.15 \leq r/p \leq 0.60$, so that in an antireflection element in which the neighboring distance p of the raised portions is approximately 180 nm, the Y value can be maintained not more than 0.27, and the chroma C* of the reflected light can be maintained not more than 5.0.

In the descriptions provided above, the neighboring distance p of the holes of the mold and the neighboring distance p of the raised portions of the antireflection element are approximately 180 nm, although the neighboring distance is not limited to this value. Hereinafter, molds f to m in which the neighboring distance p is approximately 400 nm and antireflection elements F to M which were produced using the molds f to m are described.

The mold f is manufactured as follows. First, a square glass substrate of 5 cm on each side is provided, and a 1.0 μm thick aluminum film is deposited on the glass substrate, whereby a base is formed.

Then, the anodization is performed on the base, whereby a porous alumina layer which has micropores is formed. Here, the anodization is performed for 30 seconds with the forming voltage of 200 V using a 2 wt % tartaric acid electrolytic solution at the solution temperature of 5° C., whereby micropores with the neighboring distance p of generally 400 nm are formed.

Then, the etching is performed for 100 minutes using 1 mol/L phosphoric acid at the solution temperature of 30° C. This etching increases the pore diameter of the micropores.

The anodization and the etching are repeatedly performed till adjacent holes are partially connected together. Specifically, 5 cycles of the anodization and 4 cycles of the etching process are alternately performed.

The molds g to i are manufactured in the same way as the mold f except that the etching duration is different. The etching durations for the molds g to i are 110 minutes, 120 minutes, and 150 minutes, respectively. The molds j to m are manufactured in the same way as the molds f to i except that the anodization duration is different. The anodization duration for each of the molds j to m is 45 minutes.

Figure 14:
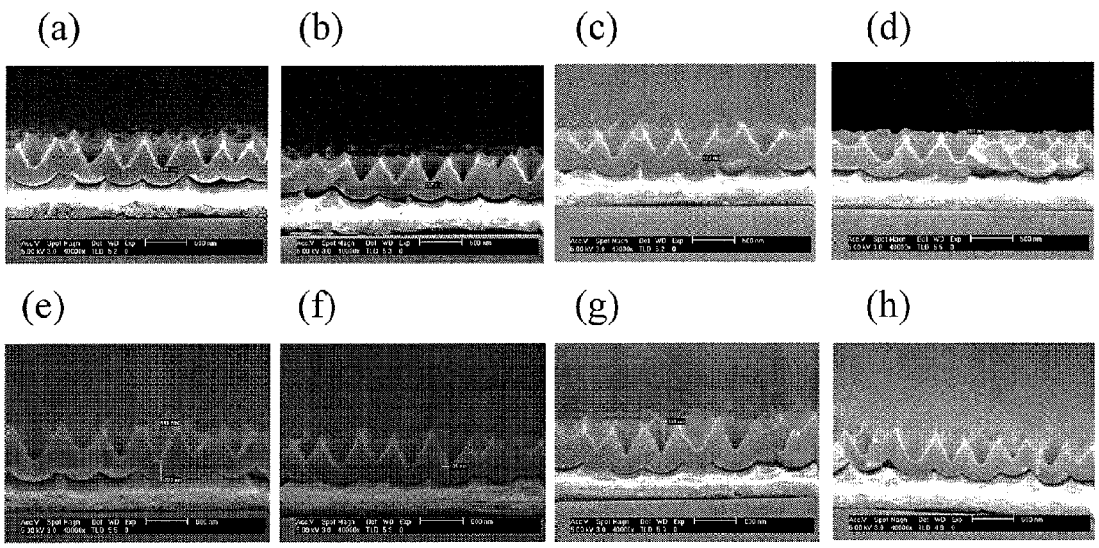
[FIG. 14] (a) to (h) are cross-sectional SEM images of molds f to m.
Figure 15:
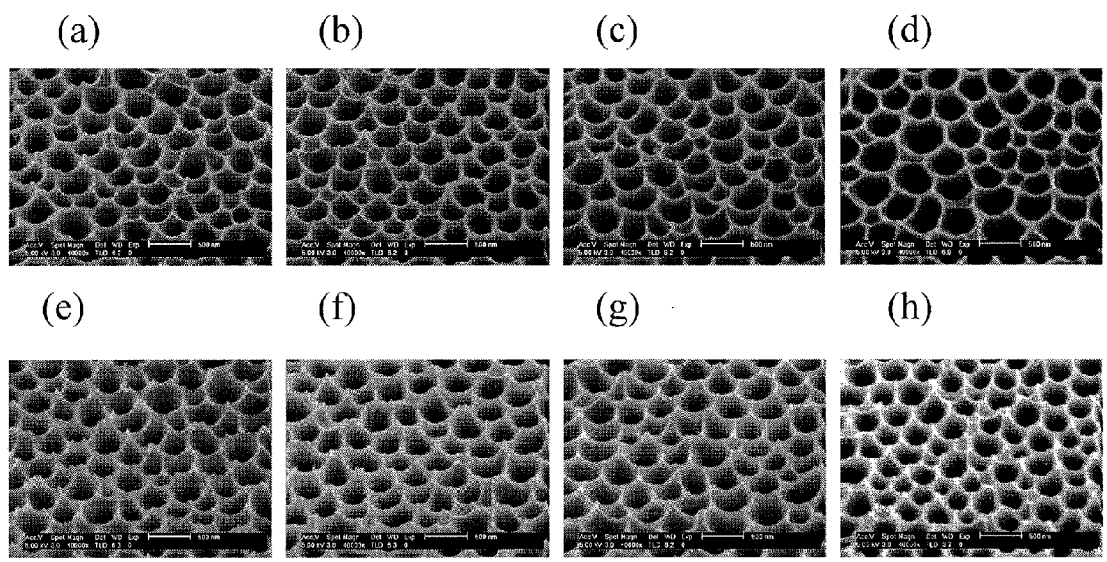
[FIG. 15] (a) to (h) are bird's-eye view SEM images of the molds f to m, which were obtained with an image capturing direction inclined by 45° relative to the direction normal to the entire mold surface.
Figure 16:
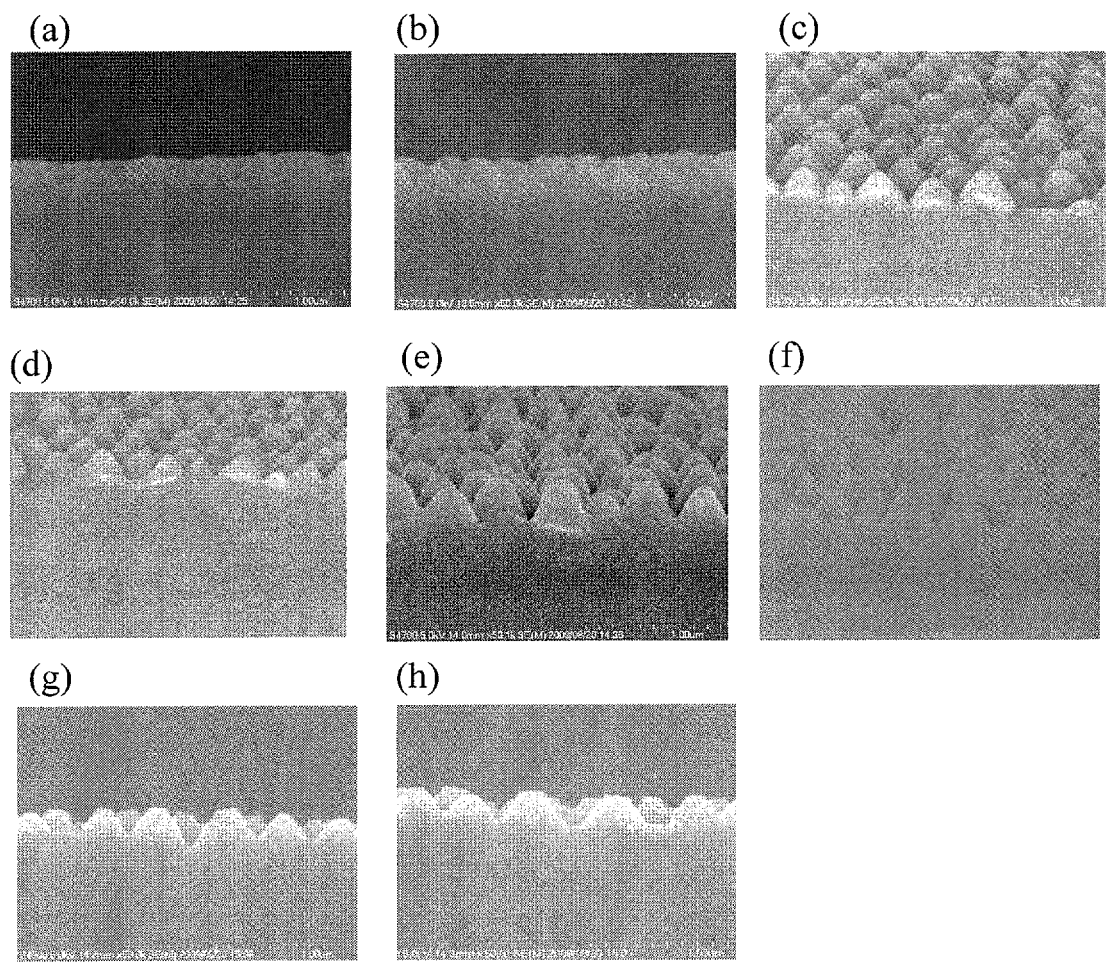
[FIG. 16] (a) to (h) are cross-sectional SEM images of antireflection elements F to M.

FIGS. 14(a) and 14(h) are cross-sectional view SEM images of the molds f to m, respectively. FIGS. 15(a) and 15(h) are 45°-inclined bird's-eye view SEM images of the molds f to m, respectively. Table 5 shows the anodization duration and the etching duration for manufacture of the molds f to m and the neighboring distance p of the holes, the hole depth q, and the saddle portion depth r of the molds f to m.

TABLE 5

| Mold | f | g | h | i | j | k | l | m |
|---|---|---|---|---|---|---|---|---|
| Anodization Duration (sec) | 30 | 30 | 30 | 30 | 45 | 45 | 45 | 45 |
| Etching Duration (min) | 100 | 110 | 120 | 150 | 100 | 110 | 120 | 150 |
| p | 404 | 417 | 404 | 408 | 420 | 412 | 406 | 411 |
| q | 380 | 380 | 386 | 384 | 400 | 400 | 410 | 405 |
| r | 110.5 | 147.4 | 165.8 | 257.0 | 105.3 | 147.4 | 1842 | 251.3 |

Although not shown herein also, in the top view SEM images of the molds f to m, the distances from the center of each hole to the centers of the three nearest holes are measured, and the average value of the measured distances is referred to as "neighboring distance p". The hole depth q is obtained in the cross-sectional view SEM image. The saddle portion depth r is obtained as follows. In a 45°-inclined bird's-eye view SEM image, the distance from an imaginary line extending between the vertexes of two protrusions provided around a certain hole to the saddle portion is measured at 20 positions, and the average value of the measured distances is obtained. In consideration of the fact that the bird's-eye view SEM image is an image obtained with an image capturing direction inclined by 45° relative to the direction normal to the entire mold surface, the average value is multiplied by √2. The product is the saddle portion depth r.

The molds f to m have different saddle portion depths r. As the etching duration increases, the saddle portion depth r increases. Note that, in the molds f to i, the hole depth q is approximately 380 nm. In the molds j to m, the hole depth q is approximately 400 nm. In this way, the hole depth q varies depending on the anodization duration of one cycle. In each of the molds f to m, the neighboring distance p is approximately 400 nm.

The molds f to m which have such configurations are used to manufacture antireflection elements F to M. The production of the antireflection elements F to M is realized by transferring the surface shape of the molds f to m to the curable resin as previously described. The raised portions of the antireflection elements F to M are formed corresponding to the holes of the molds f to m.

FIGS. 16(a) to 16(h) show the cross-sectional view SEM images of the antireflection elements F to M, respectively. The dimensions of the antireflection elements F to M are measured as described above with reference to FIG. 12.

Table 6 shows the height T and the half-value width HW of the raised portions in the antireflection elements F to M. Note that, in the antireflection elements F to M, the neighboring distance p of the raised portions is also approximately 400 nm.

TABLE 6

| | Antireflection Element | | | | | | | |
|---|---|---|---|---|---|---|---|---|
| | F | G | H | I | J | K | L | M |
| Height of raised portions T (nm) | 210 | 206 | 198 | 176 | 265 | 260 | 260 | 222 |
| Half-value width HW (nm) | 280 | 286 | 294 | 290 | 280 | 282 | 296 | 302 |

First, the antireflection elements F to I are considered. The raised portions of the antireflection elements F and G have generally equal heights T. Since the neighboring distance p of the raised portions is approximately 400 nm as described above, the raised portions of the antireflection elements F and G have generally equal aspect ratios. On the other hand, the height T of the raised portions of the antireflection element H is smaller than those of the antireflection elements F and G. The height T of the raised portions of the antireflection element I is smaller than that of the antireflection element H.

The antireflection elements F to I have different half-value widths HW. As described above, the neighboring distance p of the raised portions of the antireflection elements F to I is approximately 400 nm. In the antireflection elements F to I, the half-value width HW of the raised portions is greater than a half of the neighboring distance p, i.e., 200 nm. The raised portions have a bell-like shape.

Next, the antireflection elements J to M are considered. The raised portions of the antireflection elements J to L have generally equal heights T. Since the neighboring distance p of the raised portions is approximately 400 nm as described above, the raised portions of the antireflection elements J to L have generally equal aspect ratios. On the other hand, the height T of the raised portions of the antireflection element M is smaller than those of the antireflection elements J to L.

The antireflection elements J to M have different half-value widths HW. As described above, the neighboring distance p of the raised portions of the antireflection elements J to M is approximately 400 nm. In the antireflection elements J to M, the half-value width HW of the raised portions is greater than a half of the neighboring distance p, i.e., 200 nm. The raised portions have a bell-like shape.

Next, the reflection characteristics of the antireflection elements F to M are measured. The measurement of the reflection characteristics is performed with the antireflection elements F to M being placed over a black acrylic plate. The Y value, the L* value, a*, b* and C* of the reflected light from the antireflection elements F to M are measured in the same way as that described above.

Figure 17:
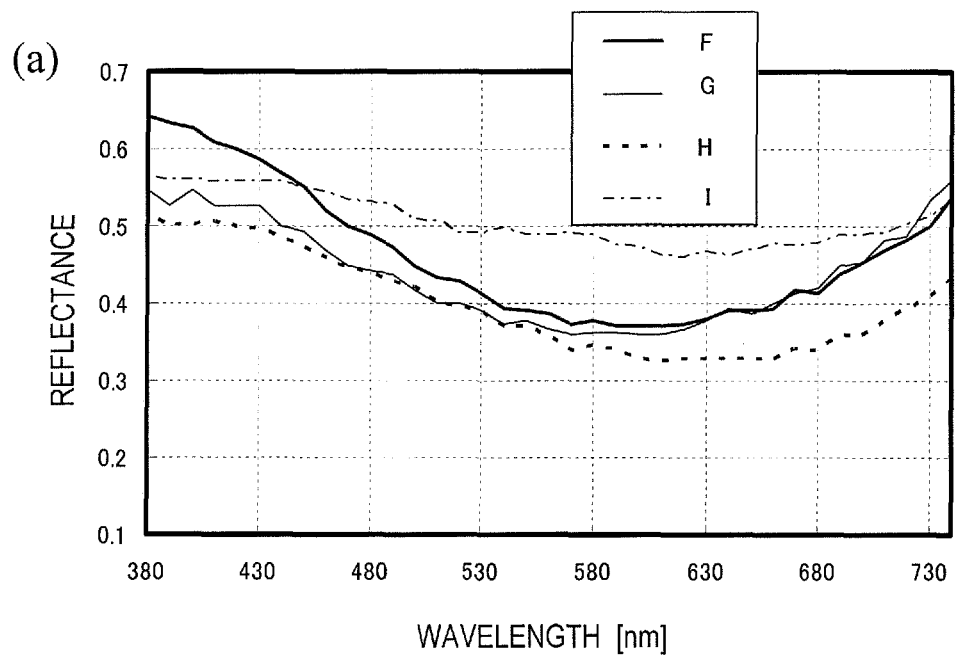
[FIG. 17] (a) is a graph showing the reflection spectrums of the antireflection elements F to I. (b) is a graph showing the reflection spectrums of the antireflection elements J to M.
Figure 17:
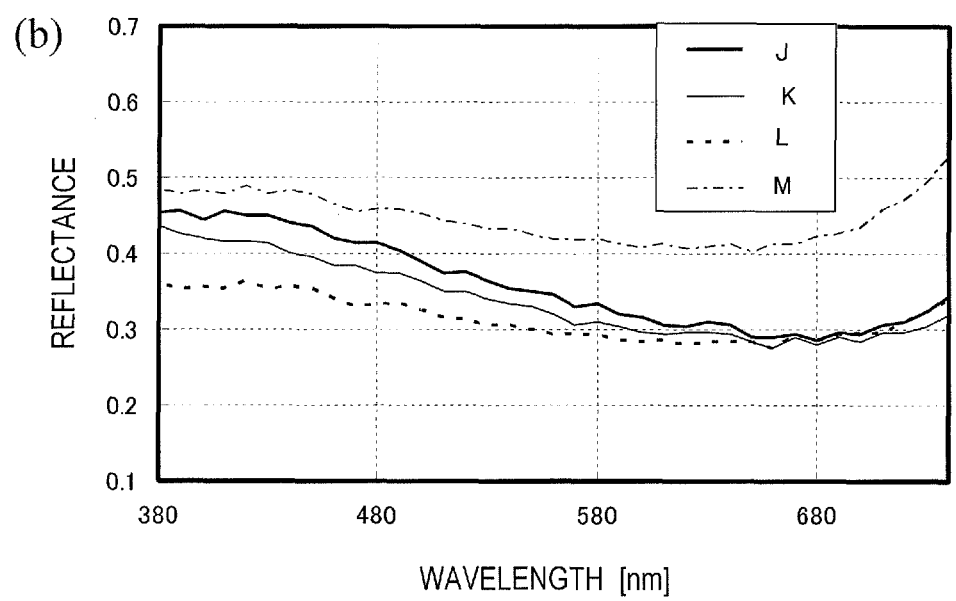
Figure 18:
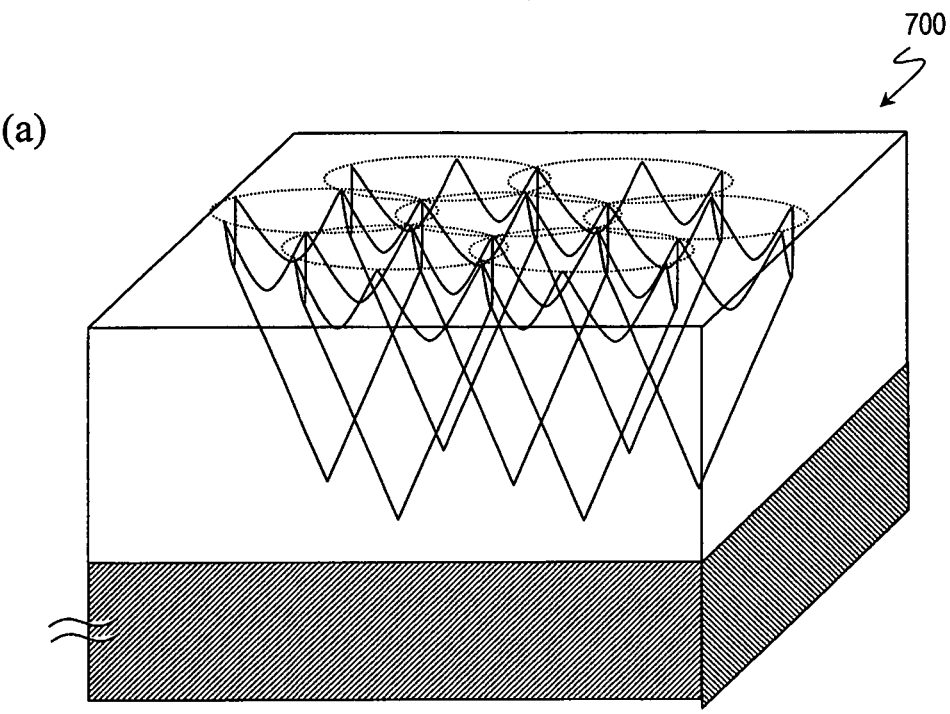
[FIGS. 18] (a) and (b) are schematic diagrams of a prior art moth-eye mold (stamper).
Figure 18:
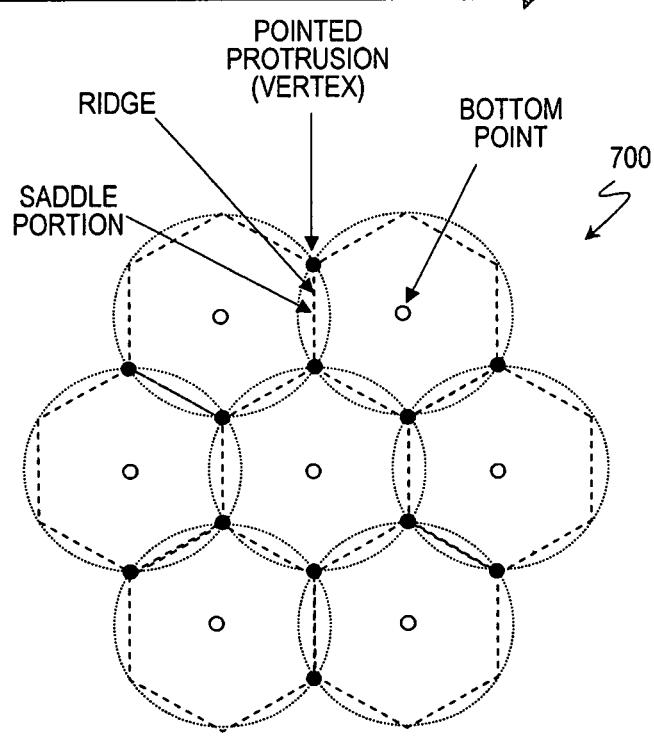

Hereinafter, the reflection spectrums of the antireflection elements F to M are described with reference to FIG. 17. FIG. 17(a) shows the reflection spectrums of the antireflection elements F to I. The reflectance of the antireflection element I is higher than those of the other antireflection elements in the wavelength range from 450 nm to 700 nm. The average reflectance of the antireflection element I is higher than the average reflectances of the antireflection elements F to H.

FIG. 17(b) shows the reflection spectrums of the antireflection elements J to M. The reflectance of the antireflection element M is higher than the reflectances of the antireflection elements J to L in the visible light range.

Table 7 shows the height T and the half-value width HW of the raised portions in the antireflection elements F to M and the Y value, the value, a*, b* and C* of the reflected light from the antireflection elements F to M.

TABLE 7

| | Antireflection Element | | | | | | | |
|---|---|---|---|---|---|---|---|---|
| | F | G | H | I | J | K | L | M |
| Height of raised portions T (nm) | 210 | 206 | 198 | 176 | 265 | 260 | 260 | 222 |
| Half-value width HW (nm) | 280 | 286 | 294 | 290 | 280 | 282 | 296 | 302 |
| Y value | 0.406 | 0.386 | 0.372 | 0.490 | 0.351 | 0.329 | 0.303 | 0.426 |
| L* value | 3.670 | 3.484 | 3.361 | 3.696 | 2.970 | 3.174 | 2.737 | 2.799 |
| a* | 0.254 | 0.277 | −0.151 | 0.040 | −0.205 | −0.248 | −0.075 | −0.020 |
| b* | −2.095 | −1.528 | −1.514 | −1.211 | −1.005 | −1.219 | −0.672 | −1.082 |
| c* | 2.110 | 1.553 | 1.522 | 1.212 | 1.025 | 1.243 | 0.676 | 1.082 |

According to the results of the measurement, the reflection intensities of the antireflection elements I and M are higher than those of the antireflection elements F to H and J to L. In the antireflection elements I and M, the height T of the raised portions is small relative to the neighboring distance p of the raised portions, so that the aspect ratio of the raised portions is small. Therefore, the antireflection elements I and M cannot sufficiently prevent reflection.

The antireflection elements F to M were irradiated with achromatic light, and reflection of the light was observed by a human eye. As a result, in either of the antireflection elements F to M, coloring of the reflection was not perceived. This is because the neighboring distance p of the raised portions is approximately 400 nm, which is considered to be relatively large, so that the probability of scattering of light is high. As a result, coloring was prevented.

Table 8 shows the anodization duration and the etching duration for manufacture of the molds f to m, the neighboring distance p of the holes, the hole depth q, the saddle portion depth r, r/p and r/q in the molds f to m, the height T and the half-value width HW of the raised portions in the antireflection elements F to M which were produced using the molds f to m, and the Y value, the L* value, a*, b* and C* of the reflected light from the antireflection elements F to M.

process, the resin that is to form the antireflection element M remains in part of the mold m corresponding to the saddle portions, so that the height T of the raised portions greatly decreases. Thus, in the antireflection elements I and M corresponding to the molds i and m that have large saddle portion depths r, the height T of the raised portions is small relative to the neighboring distance p of the raised portions. Therefore, the antireflection elements I and M cannot sufficiently prevent reflection.

As described above, in general, when the neighboring distance p of the raised portions of the antireflection element is relatively long, coloring of reflected light is unlikely to occur. However, the amount of a scattered component increases, so that the Y value becomes relatively high. According to the present embodiment, the neighboring distance p of the holes and the saddle portion depth r in the moth-eye mold satisfy the relationship of $0.15 \le r/p \le 0.60$, so that the Y value of an antireflection element in which the neighboring distance p of the raised portions is approximately 400 nm can be restricted to 0.52 or less.

Thus, by using a moth-eye mold in which the neighboring distance p of the holes and the saddle portion depth r have a

TABLE 8

| Mold | f | g | h | i | j | k | l | m |
|---|---|---|---|---|---|---|---|---|
| Anodization Duration (min) | 30 | 30 | 30 | 30 | 45 | 45 | 45 | 45 |
| Etching Duration (min) | 100 | 110 | 120 | 150 | 100 | 110 | 120 | 150 |
| p | 404 | 417 | 404 | 408 | 420 | 412 | 406 | 411 |
| q | 380 | 380 | 386 | 384 | 400 | 400 | 410 | 405 |
| r | 110.5 | 147.4 | 165.8 | 257.0 | 105.3 | 147.4 | 184.2 | 251.3 |
| r/p | 0.274 | 0.353 | 0.410 | 0.630 | 0.251 | 0.358 | 0.454 | 0.611 |
| r/q | 0.291 | 0.388 | 0.430 | 0.669 | 0.263 | 0.368 | 0.449 | 0.620 |

| | Antireflection Element | | | | | | | |
|---|---|---|---|---|---|---|---|---|
| | F | G | H | I | J | K | L | M |
| T (nm) | 210 | 206 | 198 | 176 | 265 | 260 | 260 | 222 |
| HW (nm) | 280 | 286 | 294 | 290 | 280 | 282 | 296 | 302 |
| Y value | 0.406 | 0.386 | 0.372 | 0.490 | 0.351 | 0.329 | 0.303 | 0.426 |
| L* value | 3.670 | 3.484 | 3.361 | 3.696 | 2.970 | 3.174 | 2.737 | 2.799 |
| a* | 0.254 | 0.277 | −0.151 | 0.040 | −0.205 | −0.248 | −0.075 | −0.020 |
| b* | −2.095 | −1.528 | −1.514 | −1.211 | −1.005 | −1.219 | −0.672 | −1.082 |
| C* | 2.110 | 1.553 | 1.522 | 1.212 | 1.025 | 1.243 | 0.676 | 1.082 |

Since the resin that is to form the antireflection elements F to M shrinks in the curing process, the height T of the raised portions of the antireflection elements F to M is smaller than the hole depth q of the moth-eye molds f to m. As the saddle portion depth r of the mold increases, a larger amount of the resin remains in regions between the raised portions of the antireflection element. As a result, the raised portions of the antireflection element have deformed shapes with decreased heights.

In the moth-eye molds f to h, the saddle portion depth r is relatively small, and therefore, the height T of the raised portions of the antireflection elements F to H is generally constant. However, in the moth-eye mold i, the saddle portion depth r is relatively large. Therefore, in the transfer process, the resin that is to form the antireflection element I remains in part of the mold i corresponding to the saddle portions, so that the height T of the raised portions greatly decreases.

Likewise, in the moth-eye molds j to l, the saddle portion depth r is relatively small, and therefore, the height T of the raised portions of the antireflection elements J to L is generally constant. However, in the moth-eye mold m, the saddle portion depth r is relatively large. Therefore, in the transfer predetermined relationship, an antireflection element which is capable of sufficiently preventing reflection can be realized.

Industrial Applicability

According to the present invention, an antireflection element can be preferably produced which is capable of sufficiently reducing reflection of light.

Reference Signs List 100 moth-eye mold
200 antireflection element

The invention claimed is:

1. A mold with a surface that has a shape which is inverse of a surface shape of a moth-eye structure, wherein
   the surface has a plurality of protrusions, a plurality of ridges extending between the plurality of protrusions via saddle portions, and a plurality of holes, each of which is defined by at least any three of the plurality of protrusions and ridges extending between the at least any three of the plurality of protrusions, and
   an average distance between centers of adjacent holes, p, and an average depth of the saddle portions, r, satisfy the relationship of $0.15 \le r/p \le 0.60$, wherein the average distance p is not less than 404 nm and not more than 420 nm.

2. The mold of claim 1, wherein an average depth of the plurality of holes, q, is not less than 380 nm and not more than 410 nm.

3. The mold of claim 1, wherein the surface is a surface of a porous alumina layer.

4. A method of manufacturing a mold with a surface that has a shape which is inverse of a surface shape of a moth-eye structure, comprising the steps of:

providing a base in which aluminum is provided over a surface; and forming a porous alumina layer by performing an anodization using a tartaric acid solution as an electrolytic solution and an etching on the aluminum, the porous alumina layer having a surface that has a plurality of protrusions, a plurality of ridges extending between the plurality of protrusions via saddle portions, and a plurality of holes, each of which is defined by at least any three of the plurality of protrusions and ridges extending between the at least any three of the plurality of protrusions, wherein in the step of forming the porous alumina layer, an average distance between centers of adjacent holes, p, and an average depth of the saddle portions, r, satisfy the relationship of $0.15 \leq r/p \leq 0.60$.

5. The method of claim 4, wherein in the step of forming the porous alumina layer, the average distance p is not less than 404 nm and not more than 420 nm.

6. The method of claim 4, wherein in the step of forming the porous alumina layer, an average depth of the plurality of holes, q, is not less than 380 nm and not more than 410 nm.

7. A method of forming a moth-eye structure, comprising the steps of:

manufacturing a mold according to the manufacturing method as set forth in claim 4; and irradiating the mold which is in contact with a photocurable resin, thereby curing the photocurable resin.

* * * * *